United States Patent Office 2,806,768
Patented Sept. 17, 1957

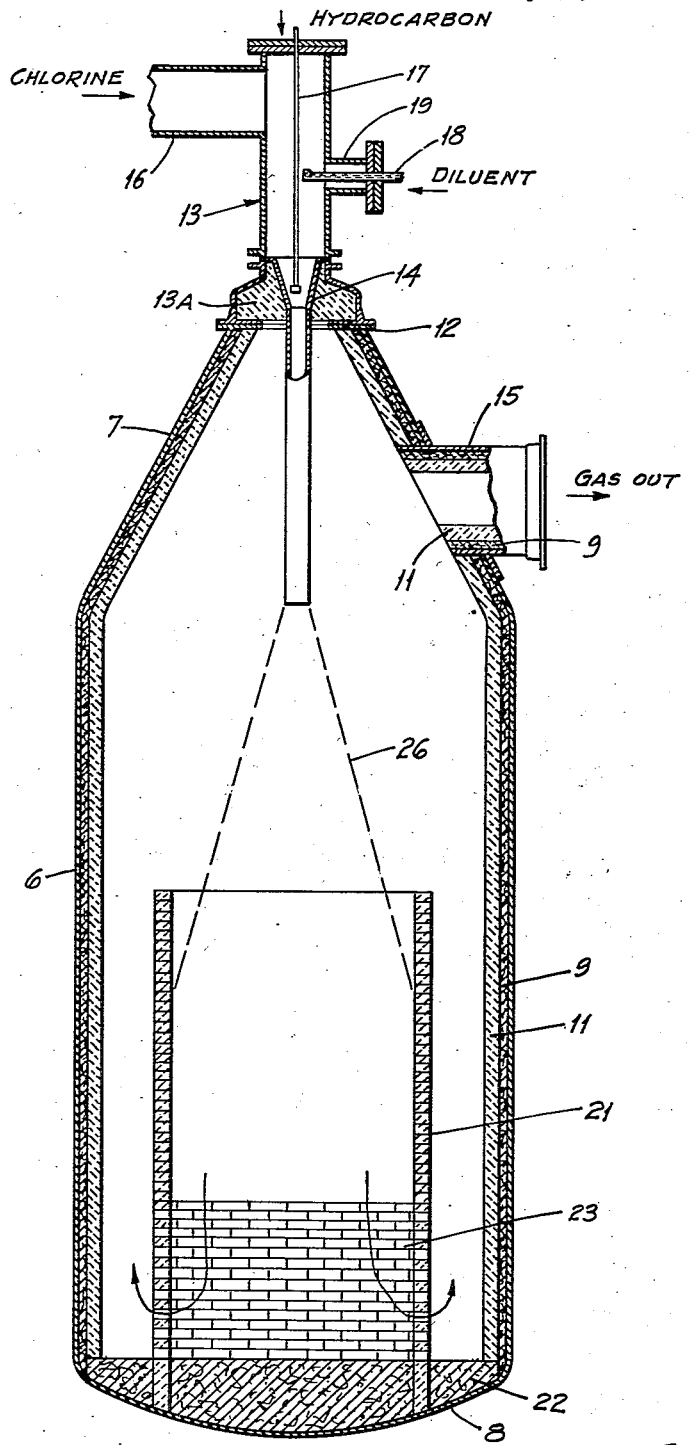

2,806,768
GAS REACTOR
Harry Bender, Torrance, and Robert P. Obrecht, Concord, Calif.
Application May 13, 1955, Serial No. 508,196
4 Claims. (Cl. 23—284)

This invention relates to apparatus suitable for exothermic gas phase chlorination reactions.

Various hydrocarbons and hydrocarbon mixtures are chlorinated to provide useful products. For example, propane is perchlorinated or fully chlorinated by substitution to provide carbon tetrachloride and perchlorethylene, the reaction being exothermic. It is desirable to have the carbon tetrachloride and perchlorethylene products substantially free of even minor amounts of partially chlorinated compounds. To secure optimum reaction conditions, thorough mixing of the reactants must be achieved and maintained and "pockets" in the reactor must be avoided. To attain satisfactory results, the temperature of reaction must be maintained within relatively close limits and in the case of propane, between 535° and 540° C. or as high as 625° C. and there must be adequate retention time and a high degree of mixing; in accordance with the present invention thorough mixing is achieved by utilizing the kinetic energy of the incoming gas in a reactor of novel design.

Because of the highly exothermic nature of these reactions, it is usual to employ a diluent to absorb sufficient heat of reaction to prevent an excessive temperature rise, the diluent being applied only in such quantity that the reaction is thermally self-sustaining and is maintained within the desired temperature range. The gases to be reacted are usually admitted to the reactor at a relatively low temperature to prevent initiation of the reaction prior to admittance to the reaction zone. It is therefore necessary that the reactants and diluent be immediately and thoroughly mixed prior to entrance and that mixing continue within the reactor and that any irregularities in the flow of the materials into or within the reactor be absent to the end that smooth and uniform operation may be attained. The reactor of the present invention is particularly characterized in that it enables uniform and smooth operation to be attained along with excellent and precise control of the reaction temperature.

It is in general the broad object of the present invention to provide a novel form of gas phase reactor for perchlorination reactions particularly one which enables an exothermic gas reaction to be carried on smoothly and with excellent control over the temperature of reaction.

Another object of the present invention is to provide a gas phase reactor which can be used with either a gas, vapor or liquid diluent or a mixture of these.

The invention includes other objects and features of advantage, some of which, together with the foregoing, will appear hereinafter wherein the present preferred form of gas phase reactor is disclosed.

In the drawing, the single figure is a side elevation partly in section, illustrating the construction of a gas phase reactor embodying this invention.

Referring to the drawing, the reactor includes an elongated tubular shell, generally indicated at 6, and having a first end 7 and a second end 8. The cylindrical shell and the first and second ends are generally made of steel and are provided with a suitable heat insulating lining as highly calcined alumina or Foamglas (a Pyrex glass containing many small bubbles), layer 11 and refractory layer 9. Although two layers 9 and 11 have been shown, a single layer of Foamglas, of from 3" to 6" may be used. The interior surface of the Foamglas may be protected further by installing a carbon or graphite liner of from 1" to 4" thickness, which is then properly keyed and cemented or pinched to the Foamglas.

The first end 7 is preferably provided in the form of a truncated cone to facilitate attachment of the lining; the upper end of the conical first end includes a flange 12 on which is mounted an inlet housing, generally indicated at 13. Preferably, that portion of the flange which extends within the shell to the inside edge of the insulation, is made of nickel, and the portion of inlet designated 13A is filled with an insulation such as highly calcined alumina or Foamglas. The inlet housing includes an inlet pipe 14 extending axially of the cylindrical chamber 6 to beyond the gas outlet 15 provided in the side wall of the first end 7. The inlet housing 13 also includes a side arm 16, through which one of the gases is admitted. An inlet pipe 17 extends axially of the housing 13 and projects downwardly into the pipe 14, while another inlet pipe 18 extends through side arm 19 in the inlet housing 13.

In use, for example, chlorine is fed in through the inlet 16, a hydrocarbon such as propane or propylene or a partially chlorinated hydrocarbon such as propylene or ethylene dichloride is fed in through the inlet 17 as liquid or as gas and the liquid diluent is fed through the inlet 18.

Also provided centrally of the chamber and extending concentrically therewith is a cylindrical baffle 21, the latter being made of a refractory material such as nonreacting refractory brick and being supported on the second end 8. A highly calcined alumina or Foamglas lining 22 is provided for the second end 8 and provides a closure for the cylindrical baffle. A portion of the lower end of the cylindrical baffle is provided with gas passages therethrough to permit the gases to pass through the wall thereof and upwardly between the inside wall of the chamber and the outer wall of the cylindrical baffle. Usually, the gas passages are provided in approximately the lower third of the cylindrical baffle and a convenient construction is provided by omitting every other brick from the brick work providing the baffle. The gas passage cross-sectional area is preferably chosen to be equivalent to the cross-sectional area of the cylindrical baffle.

The baffle extends upwardly toward the pipe 14, a distance such that the material is discharged from the pipe 14 and strikes the baffle below the open rim of the baffle. The reactor inlet pipe 14 is of such cross sectional area as to provide a superficial vapor velocity, neglecting the liquid, of 80 to 200 feet per second, and the length of this pipe's straight throat section should preferably be from 5 to 10 pipe diameters, thereby providing for ample mixing of the gas, vapor, and liquid thus discharging the materials from this pipe in the form of a cone having an included angle of about 25°–30°; the conical form of gas discharge is indicated by the dotted lines 26.

In operation, for example, chlorine, a hydrocarbon to be chlorinated and a suitable diluent are supplied respectively through the pipes 16, 17 and 18, being thoroughly mixed in the inlet housing and in the pipe 14. The gases strike the inside of the cylindrical baffle 21 and flow downwardly through the baffle and out through the open checker work portion 23 to pass upwardly between the baffle and the inside wall of the chamber. Due to the kinetic energy of the entering reactor feed, many volumes of reacted gases passing up the annulus are inspirated into the inlet end of the cylindrical baffle, thereby recirculating and thus accounting for the rapid vaporization of inlet liquid diluent and thereby also quickly bringing the inlet mixture up to a substantially uniform reaction temperature throughout the body of the reactor.

To provide uniform gas flow, it is desirable that the area of the annulus between the inside of the chamber and the chimney be equal to approximately the free cross-sectional area of the cylindrical baffle. Further, the area of the voids in the lower portion of the cylindrical baffle should be approximately equal to the free cross-sectional area of the cylindrical baffle to permit the gases to flow readily through the sidewall of the baffle. It is also desirable that the end of the discharge pipe 14 project beyond the gas outlet and preferably be at the beginning of the constriction provided by the first end 7 of the reaction chamber. If these conditions are observed, it will be found that the reactor will operate smoothly and effectively with a low rate of insulation deterioration and with a minimum formation of undesirable side products.

The apparatus can be operated in any position if the materials fed are in gaseous form. Obviously, it is preferable to operate with the first end 7 uppermost and the longitudinal axis of the chamber extending vertically if one or more of the materials fed is in liquid form.

We claim:

1. A reactor comprising an outer cylindrical vessel having opposite first and second ends; an inner cylindrical vessel extending axially of the outer vessel from the second end toward the first end with the outer side wall of the inner vessel spaced from the inner side wall of the outer vessel to provide an annular gas passage therebetween; the inner cylindrical vessel having passages adjacent the second end for gas flow from within the second vessel into the annular gas passage between the inner and the outer vessel; the inner vessel terminating in a spaced relation to the first end of the outer vessel to provide an unrestricted gas space between the first end of the outer vessel and the inner vessel into which the annular gas passage discharges; an inlet pipe extending axially of the outer vessel from the first end to discharge materials for passage through and mixing with gas flowing from the annular gas passage in said unrestricted gas space and into the inner vessel for passage therethrough and thence into said annular gas passage; and a gas outlet from the outer vessel adjacent the first end.

2. A reactor as in claim 1 wherein the free cross-sectional area of the inner vessel is approximately equal to the free cross-sectional area of the annular gas passage between the inner vessel and the outer vessel.

3. A reactor comprising an outer cylindrical vessel having a first end and an opposite conical end; an inner cylindrical vessel extending axially of the outer vessel from the first end thereof toward but spaced from the conical end to provide an unrestricted gas space in the outer vessel and its conical end; said inner vessel extending in a spaced relation to said first end and to the side wall of the outer vessel to provide an annular passage for gas from within the inner vessel for passage between the inner and outer vessels into said unrestricted gas space; an inlet pipe extending axially of the conical end to discharge materials through said unrestricted gas space and into the inner vessel; and a gas outlet from the conical end.

4. A reactor as in claim 3 wherein the free cross-sectional area of the inner vessel is approximately equal to the free cross-sectional area of the annular gas passage between the inner vessel and the outer vessel.

References Cited in the file of this patent
UNITED STATES PATENTS

| | | |
|---|---|---|
| 1,472,281 | Page | Oct. 30, 1923 |
| 1,812,080 | Chapman | June 30, 1931 |
| 2,529,598 | Deanesly | Nov. 14, 1950 |